Sept. 13, 1949.  S. HILLER, JR  2,481,748
HELICOPTER

Filed Aug. 12, 1946  7 Sheets-Sheet 1

INVENTOR.
STANLEY HILLER JR.
BY Harper Allen
Stanley Bielas
ATTORNEYS

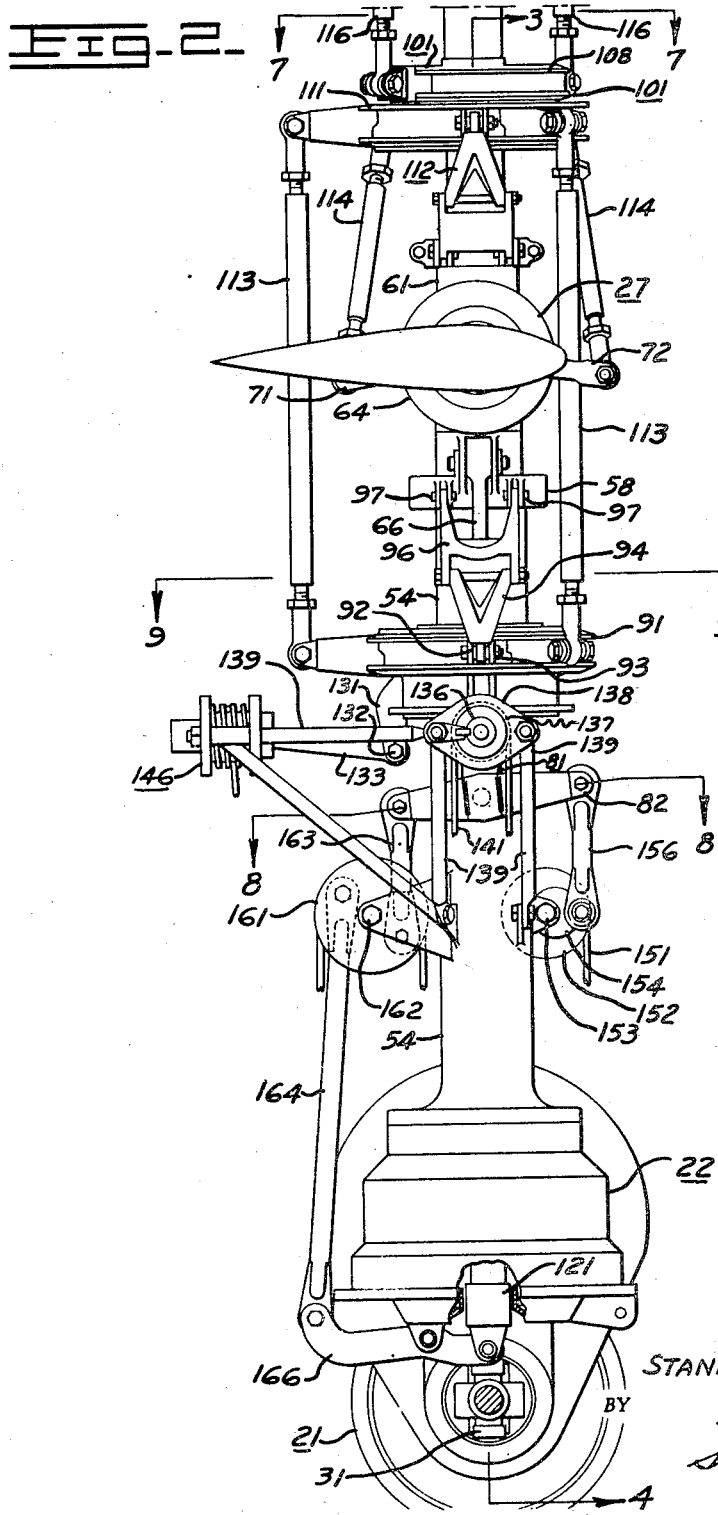

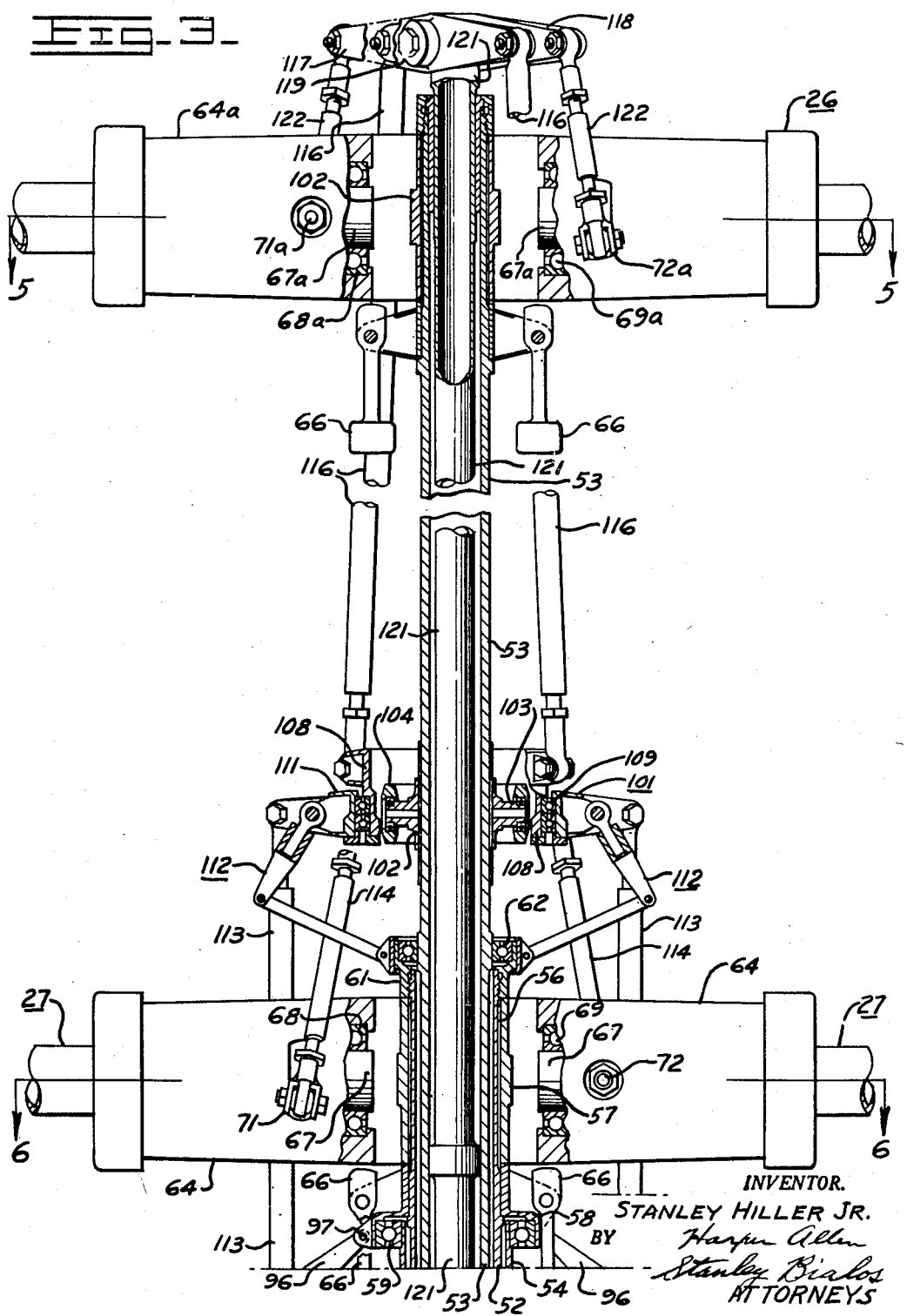

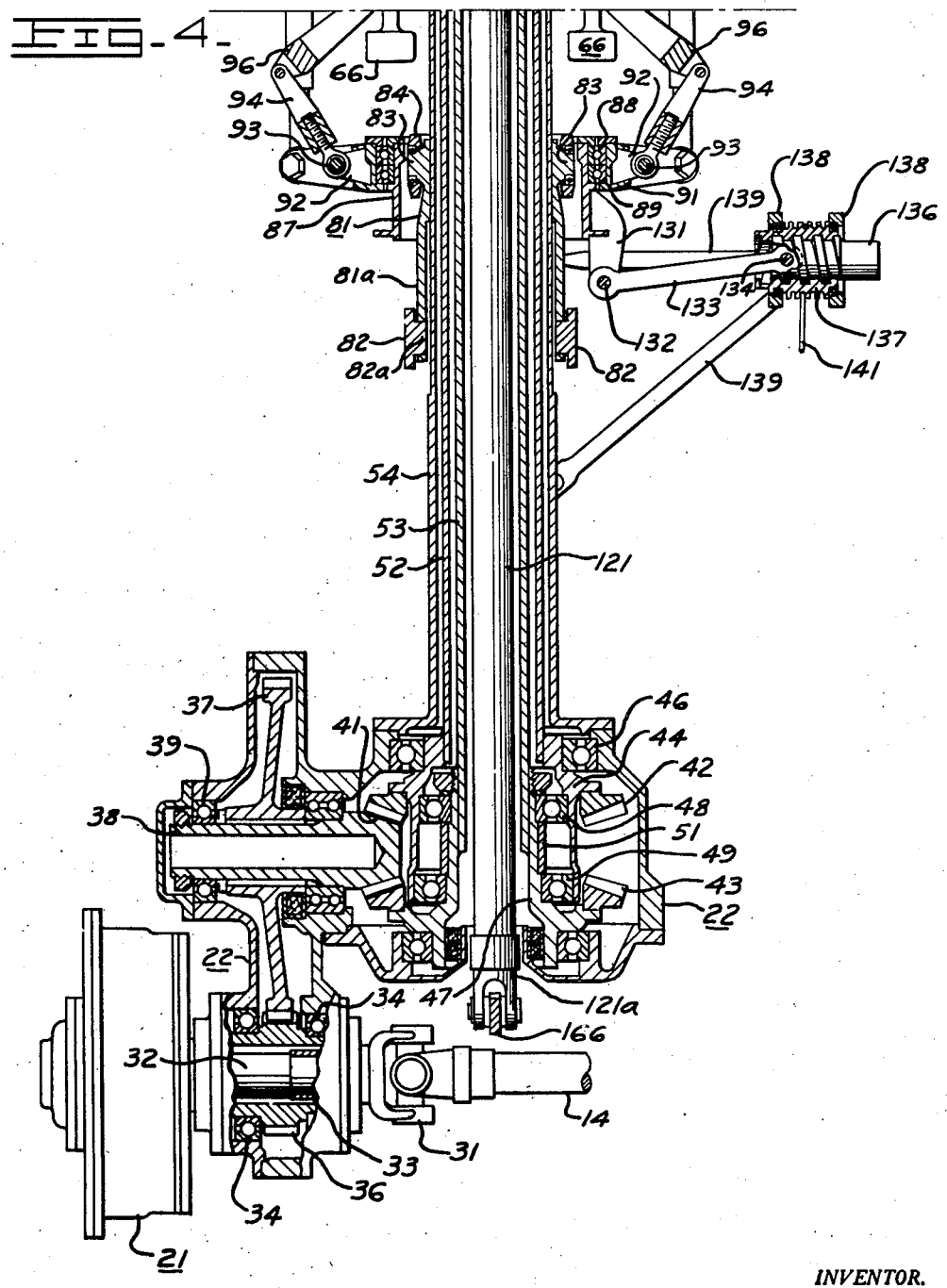

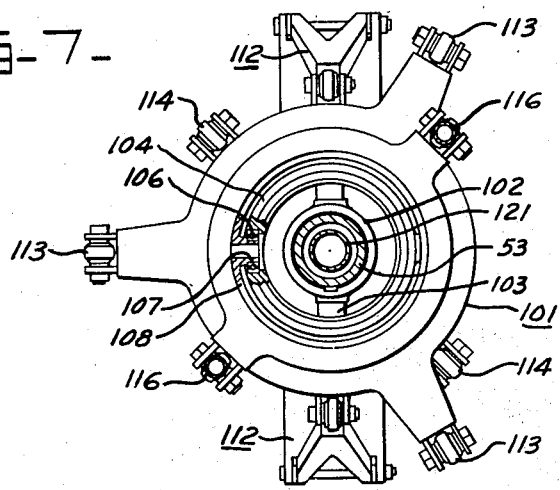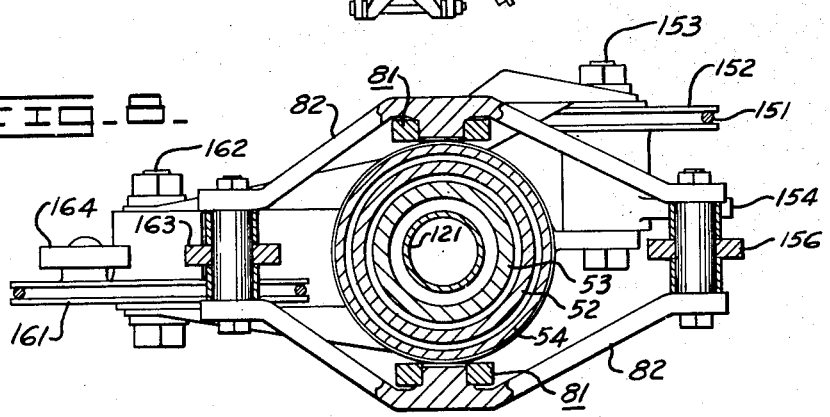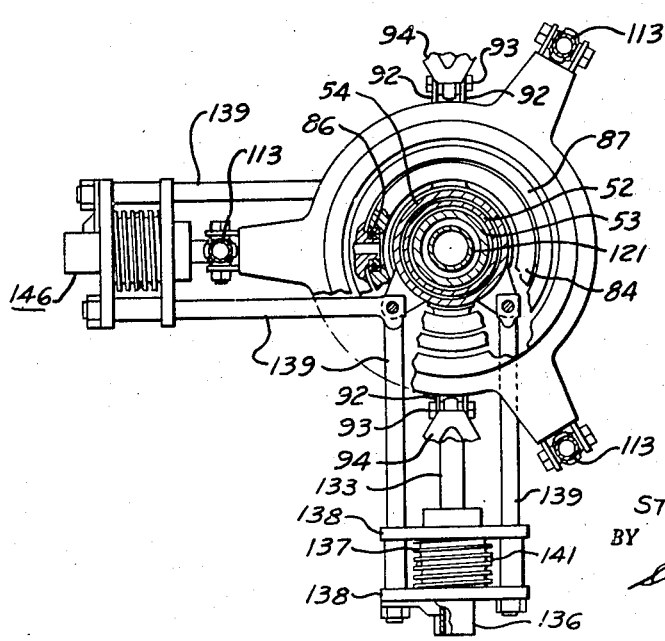

Sept. 13, 1949.    S. HILLER, JR    2,481,748
HELICOPTER
Filed Aug. 12, 1946    7 Sheets-Sheet 6
FIG-10-
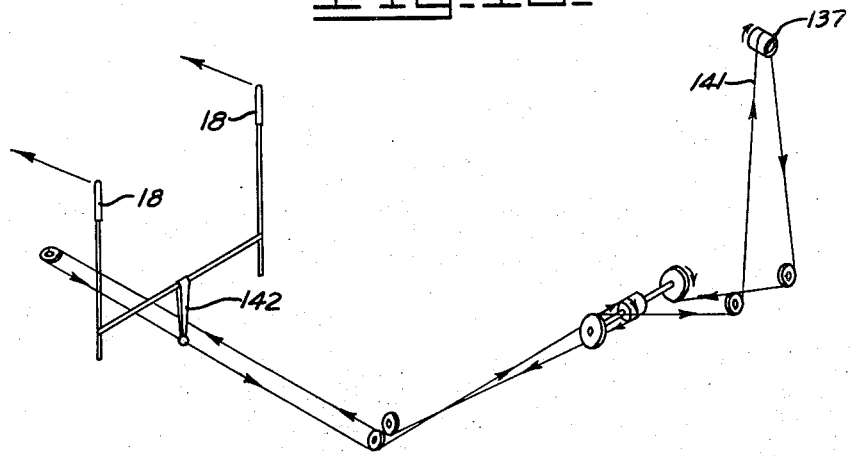
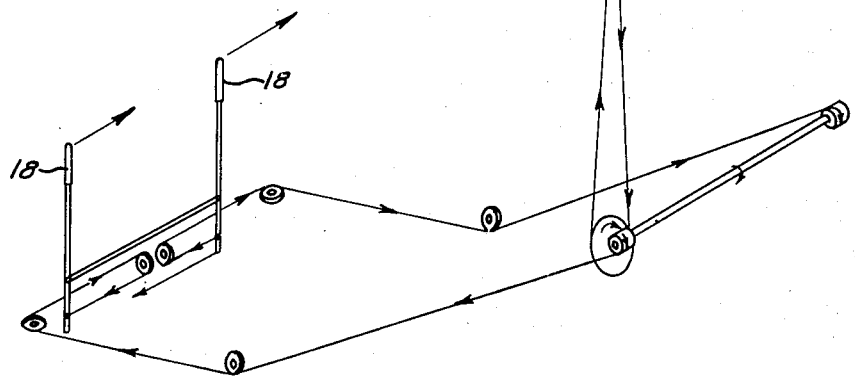
FIG-11-
INVENTOR.
STANLEY HILLER JR.
BY
ATTORNEYS Sept. 13, 1949. S. HILLER, JR 2,481,748
HELICOPTER
Filed Aug. 12, 1946 7 Sheets-Sheet 7
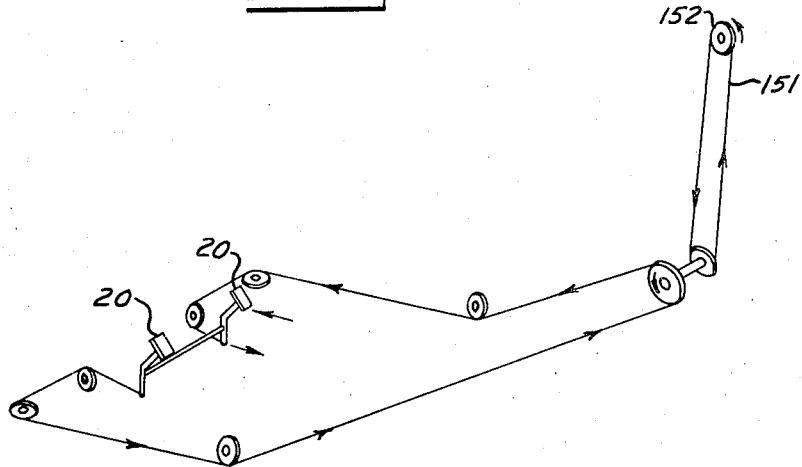
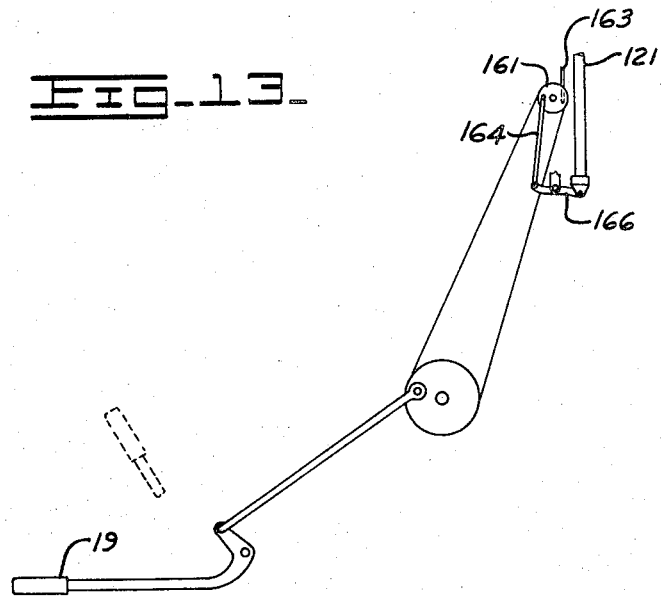
INVENTOR.
STANLEY HILLER JR.
BY Harper Allen
Stanley Bialos
ATTORNEYS Patented Sept. 13, 1949

2,481,748

UNITED STATES PATENT OFFICE 2,481,748

HELICOPTER

Stanley Hiller, Jr., Menlo Park, Calif., assignor to United Helicopters, Inc., Palo Alto, Calif., a corporation of California Application August 12, 1946, Serial No. 689,941

11 Claims. (Cl. 170—135.24)

This invention relates to helicopters of the type employing coaxial contra-rotating wings and is concerned more particularly with the provision of improved control means for the wings whereby the entire maneuvering of the helicopter is accomplished by relative adjustment of the wings.

It is a general object of the invention to provide an improved helicopter of the type having coaxial contra-rotating wings in which the angularity of the wings with respect to the axes of their rotation can vary, and in which the angularity of the wings with respect to their axes of rotation and the pitch of the wings is utilized to control maneuvering of the helicopter.

Another object of the invention is to provide control means in a helicopter of the above type in which the controls are exercised without the possibility of blacklash.

A further object of the invention is to provide a helicopter of the above type in which the relative adjustment of the wings may be selectively controlled through a floating leverage system to provide for ascending and descending of a helicopter.

Other objects and advantages of the invention will be apparent from the following description of a preferred embodiment thereof as illustrated in the accompanying drawings, in which:

Figure 2 is an elevational view of the drive head structure and the associated wobble plate control mechanism for the wings of the helicopter.

Figures 3 and 4 taken together provide a longitudinal sectional view through the drive head and control structure of the helicopter, the plane of the views being indicated by the line 3—4 in Figure 2.

Figure 5:
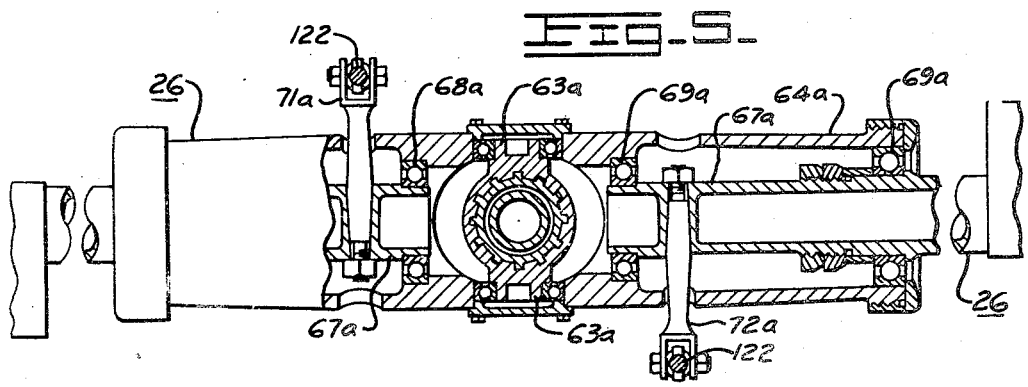

Figure 5 is a horizontal sectional view through the upper wing mounting on the drive head structure as indicated by the line 5—5 in Figure 3.

Figure 6:
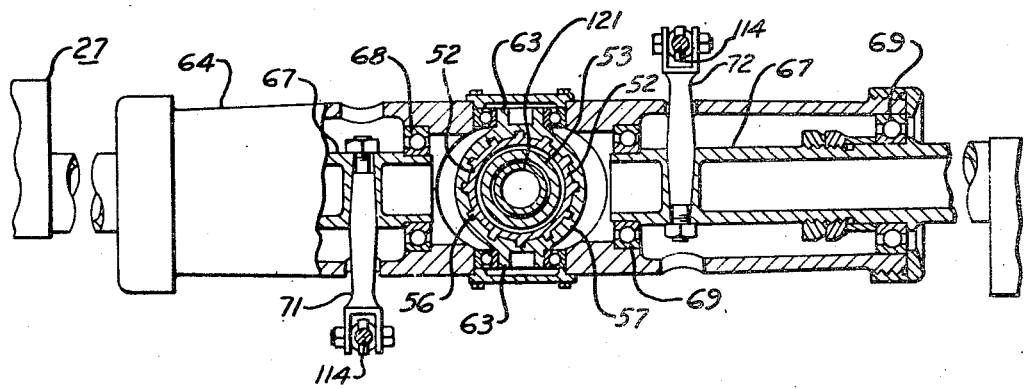

Figure 6 is a horizontal sectional view through the lower wing mounting on the drive head structure as indicated by the line 6—6 in Figure 3.

Figure 7 is a sectional elevational view of the upper wobble plate mechanism, the view being taken as indicated by the line 7—7 in Figure 2.

Figure 8 is a sectional view of a part of the control mechanism for the upper and lower wobble plates, the view being taken as indicated by the line 8—8 in Figure 2.

Figure 9 is a horizontal sectional view of the lower wobble plate and associated control mechanism, the view being taken as indicated by the line 9—9 in Figure 2.

Figure 10 is a schematic view of the control linkage from the double stick mechanism in the cockpit of the helicopter to the fore and aft control.

Figure 11 is a schematic view similar to Figure 10 showing the connection of the double stick control for causing lateral movement of the helicopter.

Figure 12 is a schematic view of the foot pedal control for causing turning of the body of the helicopter.

Figure 13 is a schematic view of the stick control for causing ascent or descent of the helicopter.

The maneuvering of a helicopter of the type employing coaxial contra-rotating wings wherein the wings are free to pivot with respect to their axes of rotation is effected in accordance with the instant invention by continuously controlling the pitch of the wings as they rotate so that the "bite" of each wing can be varied, for example, by tilting of the wings at various points of the 360° cycle of rotation to effect movement of the helicopter in the desired direction.

It will be seen that by adjusting the point of maximum bite in the 360° cycle of rotation the helicopter can be maneuvered bodily in any desired direction. Also, by changing the total bite more or less the helicopter can be caused to ascend or descend. Further, by unbalancing the rotative torque effects between the two contra-rotating wings the body of the helicopter can be turned about its axis to change the direction of flight.

The instant invention is designed to provide for accurate control of the wings through the means of wobble plate mechanisms which are preferably adjusted by means of anti-backlash drive-transmitting connections so that the adjusted tilt or bite of each wing is accurately controlled. Also, for varying the relative control of the upper and lower wings in a selected manner, an advantageous type of floating leverage system is provided to facilitate this end.

Figure 1:
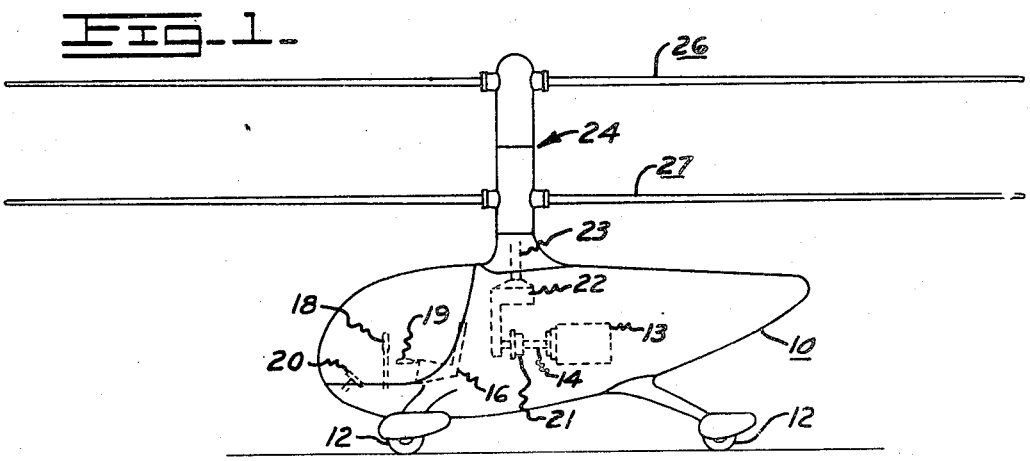
Figure 1 is a side elevational view of a helicopter embodying the instant invention.

Referring to the drawings, there is shown in Figure 1 somewhat schematically an elevational view of a helicopter embodying the instant invention. The helicopter may comprise a body 10 having a suitable form of landing gear 12. Within the body 10 there is provided a power plant 13 rearwardly of a pilot seat 16 in the cockpit or pilot's compartment. Within the pilot's compartment the various operating controls are provided including a vertically disposed double stick or post 18, a horizontally disposed single stick or control post 19 and a pair of foot pedals 20. The drive from the power plant 13 may be transmitted through a shaft 14, a suitable form of clutch 21 and a gear box 22 to a vertically disposed tubular shaft structure 23 extending upwardly into and forming part of a drive head structure 24 which carries and drives the respective upper and lower wing structures 26 and 27.

Referring to Figure 4, the drive shaft 14 is connected by means of a universal joint 31 with a drive shaft 32 suitably journalled within a driven sleeve 33 mounted by bearings 34 within the gear case 22. The drive shaft 32 and the driven sleeve 33 are connected through the clutch mechanism 21. The sleeve 33 carries a pinion 36 which meshes with a gear 37 suitably splined or otherwise secured on a sleeve 38 mounted by bearings 39 within the gear case. The sleeve 38 carries at one end a bevel pinion 41 which meshes with respective upper and lower bevel gears 42 and 43. The upper bevel gear 42 is secured on a mounting sleeve member 44 which is journalled within the gear case by an upper bearing 46 and on the inner drive sleeve 47 for the gear 43 by means of vertically spaced bearings 48 and 49 having a spacer 51 interposed therebetween. The upper bevel gear 42 and its mounting sleeve 44 are secured at the lower end of an outer tubular drive shaft 52 while the lower bevel gear 43 and its mounting sleeve 47 are secured at the lower end of an inner tubular drive shaft 53, both of these shafts being enclosed within a tubular casing 54 secured on the gear case 22. As will be apparent, the outer tubular drive shaft 52 provides the drive for the lower wing structure 27 while the inner tubular drive shaft 53 provides the drive for the upper wing structure 26.

Referring to Figures 3, 4 and 6, the outer tubular drive shaft 52 is splined adjacent its upper end at 56 to receive the support and drive hub 57 for the lower wing structure 27, the hub 57 being fixed between a lower support sleeve 58 which is journalled by a bearing 59 on the casing 54 and an upper clamping sleeve 61 which is threadedly engaged with the drive shaft 52 and is journalled by bearing 62 about the inner tubular drive shaft 53. The drive hub 57 is provided with opposite trunnions 63 (Figure 6) by means of which the wing structure including the central support portion 64 is mounted for pivotal movement about an axis transversely to the axis of the drive shaft therefor. During low speed rotative movement of the wing structure, the extent of movement thereof relative to its axis of rotation is controlled by means of a pair of centrifugally controlled stops 66 of the type disclosed in my copending application Serial No. 657,373, filed March 27, 1946.

For purposes of control of the helicopter the respective wings of the lower wing structure are provided with shaft extensions 67 (Figures 3 and 6) journalled by respective bearings 68 and 69 within the adjacent end of the central support section 64 so that the pitch of the wing can be adjusted by rotation of the wing with respect to its central support section by means including the control arms 71 and 72 in a manner later described.

The upper wing structure 26 is similarly mounted for pivoting movement with respect to the inner tubular drive shaft 53 as seen in Figures 3 and 5 where similar parts have been given similar numbers with the suffix "a."

As previously explained, the maneuvering control of the helicopter is obtained by simultaneously and selectively controlling the pitch or bite of the wings of the helicopter so that these wings will assume desired planes of rotation and will exert the proper torque or force effects upon the helicopter to accomplish movement in the desired direction. This control is exercised by means including a pair of wobble mechanisms, one for each of the wing structures, these wobble mechanisms being generally similar in construction and mounting.

Referring to Figures 2, 3, 4 and 7 to 9, the lower wobble mechanism includes a mounting sleeve 81 which is slidably mounted upon a reduced upper portion of the tubular casing 54 and is adjustably controlled as to position thereon by means of a pair of oppositely disposed levers 82, referred to in greater detail hereinafter, having pivot trunnions 82a engaging respectively within the downwardly extending arms 81a of the mounting sleeve 81. The mounting sleeve 81 is also provided with opposite trunnions 83 having journalled thereon the gimbal ring 84 of a universal mounting for the wobble mechanism. The gimbal ring 84 in turn provides a bearing support at 86 (Figure 9) for the outer universal ring 87 of the universal mounting which carries, by means of respective bearings 88 and 89, the outer wobble plate or ring 91 of the lower wobble mechanism.

The wobble plate 91 has oppositely disposed radially extending sets of ears 92 carrying between them in each case a pivot pin 93 for an upwardly extending V-shaped arm 94 of a toggle linkage including an upper arm 96 (Figures 2, 3 and 4) having respective spaced pivotal connections to the lower support sleeve 58. The toggle linkage provides a drive connection from the hub 57 of the lower wing structure 27 to the wobble plate 91 while providing for relative axial movement therebetween.

The upper wobble mechanism indicated generally at 101 is generally similar in construction and mounting to the lower wobble mechanism. Referring to Figures 2, 3 and 7, the upper wobble mechanism includes an inner hub 102 slidably splined on the inner tubular drive shaft 53 and having opposite trunnions 103 for journalling of a gimbal ring 104. The gimbal ring 104 carries respective opposite bearings 106 for the inwardly projecting trunnions 107 of the universal ring 108 upon which is mounted, by means of bearings 109, the upper wobble plate 111. The upper wobble plate 111 is connected by means including opposite toggle linkages 112 with the clamping sleeve 61 for the hub 57 of the lower ring structure 27 so that the wobble plates 91 and 111 are connected for simultaneous rotation with the lower wing. They are also connected for parallel tilting movement by means including a set of three links 113 symmetrically disposed with respect to the wobble plates and pivotally connected thereto respectively.

In order to control varying of the pitch of the respective wings from the wobble plates, the upper wobble plate 111 (Figures 2, 3, 6 and 7) is connected by respective opposite similar links 114 with respective outwardly projecting pitch or "bite" control arms 71 and 72 of the lower wing structure 27. Similarly, the universal ring 108 of the upper wobble plate is connected by respective links 116 with the opposite ends of a pair of control levers 117 and 118, respectively, having pivotal mountings at 119 on a tubular control post 121 and having their respective opposite ends connected by respective links 122 (Figures 3 and 5) with the pitch control arms 71a and 72a of the upper wing structure 26.

From the above description it is seen that both of the wobble mechanisms are mounted for universal movement with respect to the axis of rotation of the drive head structure and the wing structures, and are connected for similar parallel disposition with respect thereto.

The control for the tilting adjustment of the wobble plates is preferably exercised through an antibacklash adjusting drive arrangement as illustrated particularly in Figures 2, 4 and 9. For controlling forward and rearward movement of the helicopter, the inner stationary universal ring or portion 87 of the lower wobble mechanism is provided with a depending arm 131 which is pivotally connected at 132 to a link 133 pivotally mounted at 134 within a relatively coarsely threaded screw 136 disposed within a complementary nut 137 journalled between respective end plates 138 which are secured together and mounted on the tubular housing 54 by respective supporting struts 139. The outer surface of the nut 137 is also threaded to receive a flexible member in the form of an adjusting wire or cord 141 which, as seen in Figure 10, is looped over and in engagement with the periphery of the nut and is connected to a depending arm 142 of the double control post 18. Fore and aft movement of this control post will rotate the adjusting sleeve 137 and cause corresponding axial translation of the screw 136, and, consequently, fore and aft tilting of the lower wobble mechanism and, by virtue of their connection, also of the upper wobble mechanism. The pitch of the screw 136 and the nut 137 is such that the adjusting mechanism is self-locking against any undesired movement because of thrust from the wobble mechanism, and the adjusting mechanism operates without backlash. The fore and aft tilting of the wobble mechanism operates through the links 114, 116 and 122 to effect a controlled cyclic variation of the pitch of the wings as referred to hereinafter to cause forward or rearward movement of the helicopter.

To effect lateral tilting of the wobble plates for bodily sidewise movement of the helicopter, a similar screw and nut adjusting mechanism 146 is provided, as seen in Figures 2 and 9, with its operating cord or wire connected, as seen in Figure 11, to the respective lower ends of the double posts 18 so that lateral movement of these posts will effect lateral tilting of the wobble plate mechanism and correspondingly a varied control of the wing pitch to cause bodily lateral movement of the helicopter.

As previously stated, the foot pedals 20 are utilized to effect turning of the helicopter body about its axis (i. e. the axis of rotation of the wings) and for this purpose the foot pedals 20 (Figure 12) are connected by a cord or wire 151 to a pulley 152 (Figures 2 and 8), journalled at 153 on the housing 54 and having an arm 154 connected by a link 156 with one end of the floating lever system 82 so that rotation of the pulley 152 clockwise, as viewed in Figure 2, will serve to lower the wobble plates 91 and 111. This downward movement of the wobble mechanism serves through the links 114 to decrease the pitch of the lower wings, and through the links 116, levers 117 and 118 and links 122 to increase the pitch of the upper wings, thereby relatively adjusting the pitch or bite of the wings to cause a torque effect on the body to turn it clockwise as viewed from the top, i. e. to the right. In a similar manner the left foot pedal 20, when operated, will cause a counterclockwise movement of the pulley 152 and will raise both of the wobble plates to adjust the pitch of the wings to cause turning to the left, i. e. counter-clockwise turning as viewed from the top.

In order to cause the helicopter to ascend or descend, the single control post 19 is lifted for ascent and returned for descent, and this post 19 is connected through a cord and pulley arrangement (Figures 2, 8 and 13) with a disk 161 pivoted at 162 on the housing 54. The disk 161 is connected by a link or crank arm 163 with the end of the floating lever system 82 opposite from its connection to the turn control link 156. The disk 161 is also connected by a link 164 with a lever 166 pivoted on the gear case 22 and also pivotally connected to a fork 121a journalled about the lower end of the control rod 121. It will be seen, therefore, that movement of the single post 19 will rotate the pulley 161 to raise or lower the wobble plates and that at the same time to move the control rod 121, the wobble plates and the control rod being raised or lowered simultaneously. As previously explained, raising of the wobble plates serves to decrease the pitch of the upper wings and to increase the pitch of the lower wings, while raising of the control rod 121 serves to increase the pitch of the upper wings without affecting the pitch of the lower wings. Inasmuch as the leverage connections are such that the effect of the movement of the control rod 121 is twice that of the vertical movement of the wobble plates, the simultaneous raising or lowering of the wobble plates and the control rod 121 serves to effect a simultaneous and equal decrease or increase of the pitches of the wing structures so that the helicopter will ascend or descend in accordance with the adjustment of the single control lever or post 19.

The operation of the various control mechanisms can be briefly summarized as follows: To effect forward movement of the aircraft, the double control post 18 is moved forwardly in the cockpit to tilt the wobble plates 91 and 111 and thereby control the positions of maximum and minimum bite of the wings so that the resultant tilting of their plane of rotation is forwardly of the helicopter, thus providing a forward force. For rearward movement of the helicopter, the double control post 18 is moved aft producing an opposite tilting of the wobble plates with an opposite effect on the plane of rotation of the wings and rearward movement of the helicopter.

For bodily sidewise movement of the helicopter, the double control post 18 is moved to the right or the left in accordance with the desired direction of movement and the wobble plates are correspondingly tilted to give a plane of rotation of the wings with its lowest edge in the desired direction of movement.

To effect turning of the helicopter body about the drive axis for the wings, the respective foot levers or pedals 20 are operated to raise and lower the wobble plates to respectively increase and decrease the pitch of the upper and lower wings and thereby unbalance the torque effect between the respective wings and produce turning of the body.

To effect ascent and descent of the helicopter, the single control post or lever 19 is operated to simultaneously raise or lower the wobble plates and the control rod 121 so that respective simultaneous equal increases or decreases of the respective pitches of the upper and lower wing structures is effected to increase or decrease their total bite and thereby effect ascent or descent.

From the above description it is seen that by appropriate cyclic control of the pitch of the wings of the helicopter, the plane can be maneuvered in any desired direction. In this connection it is to be noted that because of the linkage connection from the wobble mechanisms to the wings, and also the cyclic variation of pitch of the wings during each rotation that the plane of rotation of the wings is tilted correspondingly to the adjusted tilt of the wobble mechanism.

While I have shown certain preferred embodiments of the invention, it will be apparent that the invention is capable of further variation and modification and its scope should be limited only by the scope of the claims attached hereto.

I claim:

1. A helicopter comprising a body, a set of wings rotatable in one direction about a drive axis, another set of wings rotatable in an opposite direction about said drive axis, each of said sets of wings being mounted for end to end pivoting movement about a pivotal axis transverse to said drive axis and each wing being mounted for pitch adjustment about its own axis, a wobble system including wobble mechanism and linkage associated with each set of wings for adjusting the pitch of the wings during rotation thereof for directional control, means mounting each of said wobble mechanisms for axial adjustment along said drive axis, said wobble mechanisms being directly interconnected for simultaneous axial adjustment along said axis to adjust through such linkage the pitch of said wings with the pitch of one set of wings adjustable opposite to that of another set of wings to effect turning of said body about said drive axis, a control system connected to one set of wings for effecting additional adjustment of the pitch of said one set of wings independently of the adjustment of both sets of said wings in said opposite directions, and means connecting the control system for adjustment along said drive axis with the wobble mechanisms to cause the pitch of all sets of wings to be adjusted simultaneously in the same direction for altitude control.

2. A helicopter comprising a body, a set of wings rotatable in one direction about a drive axis, another set of wings rotatable in an opposite direction about said drive axis, each of said sets of wings being mounted for end to end pivoting movement about a pivotal axis transverse to said drive axis and each wing being mounted for pitch adjustment about its own axis, a wobble system including wobble mechanism and linkage associated with each set of wings for adjusting the pitch of the wings during rotation thereof for directional control, means mounting each of said wobble mechanisms for axial adjustment along said drive axis, said wobble mechanisms being directly interconnected for simultaneous axial adjustment along said axis to adjust through such linkage the pitch of said wings with the pitch of one set of wings adjustable opposite to that of another set of wings to effect turning of said body about said drive axis, a control system connected to one set of wings for effecting additional adjustment of the pitch of said one set of wings independently of the adjustment of both sets of said wings in said opposite directions, and means connecting the control system for adjustment along said drive axis with the wobble systems to cause such additional adjustment of the pitch of said one set of wings to be opposite to and double the pitch adjustment effected thereon by the associated wobble mechanism.

3. A helicopter comprising a body, a set of wings rotatable in one direction about a drive axis, another set of wings rotatable in an opposite direction about said drive axis, each of said sets of wings being mounted for end to end pivoting movement about a pivotal axis transverse to said drive axis and each wing being mounted for pitch adjustment about its own axis, a wobble system including wobble mechanism and linkage associated with each set of wings for adjusting the pitch of the wings during rotation thereof for directional control, means mounting each of said wobble mechanisms for axial adjustment along said drive axis, said wobble mechanisms being directly interconnected for simultaneous axial adjustment along said axis to adjust through such linkage the pitch of said wings with the pitch of one set of wings adjustable in a direction opposite to that of another set of wings to effect turning of said body about said drive axis, a first control member and a second control member associated with the wobble mechanisms to cause such axial adjustment thereof, means for independently operating such control members, a common link between said control members, a connection between said links and said wobble mechanisms, a control system connected to one set of wings for effecting additional adjustment of the pitch of said one set of wings independently of the adjustment of both sets of said wings in said opposite directions, and means connecting the control system and one of said control members to cause the pitch of all sets of wings to be adjusted simultaneously in the same direction for altitude control, manipulation of another of said control members enabling said axial adjustment of the wobble systems independent of said control system.

4. A helicopter comprising a body, wing drive means mounted on said body comprising an upright outer hollow shaft and an upright inner hollow shaft within the outer shaft and projecting beyond an end thereof, said shafts being rotatable in opposite directions about a common drive axis, means mounting a first wing on the projecting portion of the inner shaft for rotation therewith and pitch adjustment thereon, means mounting a second wing on the outer shaft for rotation therewith and pitch adjustment thereon, a first wobble mechanism between said wings, a second wobble mechanism below said second wing, means mounting each of said wobble mechanisms for axial adjustment along said drive axis, a linkage system connecting said wobble mechanisms with said wings and interconnecting said wobble mechanisms for simultaneous adjustment along said drive axis in either direction for adjusting the pitch of said wings in opposite directions, a control rod within the inner hollow shaft projecting beyond the upper end thereof and adjustable axially along said drive axis; said linkage including a lever member pivotally anchored on the projecting end of said control rod for effecting upon axial movement of said control rod with said wobble mechanisms, additional pitch adjustment of said first wing opposite to and double the pitch adjustment effected thereon by axial adjustment of said wobble mechanisms; and a control system for effecting selective simultaneous axial adjustment of said wobble mechanisms alone or simultaneous axial adjustment of said wobble mechanisms together with said control rod comprising a first control member and a second control member, means for independently operating said control members, a link between said control members, a connection between said link and said second wobble mechanism, and a linkage connection between one of said control members and said control rod.

5. A helicopter comprising a body, wing drive means mounted on said body comprising an upright outer hollow shaft and an upright inner hollow shaft within the outer shaft and projecting beyond an end thereof, said shafts being rotatable in opposite directions about a common drive axis, means mounting a first wing on the projecting portion of the inner shaft for rotation therewith and pitch adjustment thereon, means mounting a second wing on the outer shaft for rotation therewith and pitch adjustment thereon, a first wobble mechanism between said wings, a second wobble mechanism below said second wing, means mounting each of said wobble mechanisms for axial adjustment along said drive axis, a linkage system connecting said wobble mechanisms with said wings and interconnecting said wobble mechanisms for simultaneous adjustment along said drive axis in either direction for adjusting the pitch of said wings in opposite directions, a control rod within the inner hollow shaft projecting beyond the upper end thereof and adjustable axially along said drive axis; said linkage including a lever member pivotally anchored on the projecting end of said control rod for effecting upon axial movement of said control rod with said wobble mechanisms, additional pitch adjustment of said first wing opposite to and double the pitch adjustment effected thereon by axial adjustment of said wobble mechanisms; and a control system for effecting selective simultaneous axial adjustment of said wobble mechanisms alone or simultaneous axial adjustment of said wobble mechanisms together with said control rod comprising a first pivotally mounted control member and a second pivotally mounted control member, means for independently operating said control members, a link pivotally connected to said control members, means pivotally connecting said link to said second wobble mechanism, and a linkage connection between one of said control members and said control rod.

6. A helicopter comprising a body, wing drive means mounted on said body comprising an upright outer hollow shaft and an upright inner hollow shaft within the outer shaft and projecting beyond an end thereof, said shafts being rotatable in opposite directions about a common drive axis, means mounting a first wing on the projecting portion of the inner shaft for rotation therewith and pitch adjustment thereon, means mounting a second wing on the outer shaft for rotation therewith and pitch adjustment thereon, a first wobble mechanism between said wings, a second wobble mechanism below said second wing, means mounting each of said wobble mechanisms for axial adjustment along said drive axis, a linkage system connecting said wobble mechanisms with said wings and interconnecting said wobble mechanisms for simultaneous adjustment along said drive axis in either direction for adjusting the pitch of said wings in opposite directions, a control rod within the inner hollow shaft projecting beyond the upper end thereof and adjustable axially along said drive axis; said linkage including a lever member pivotally anchored on the projecting end of said control rod for effecting upon axial movement of said control rod with said wobble mechanisms, additional pitch adjustment of said first wing opposite to and double the pitch adjustment effected thereon by axial adjustment of said wobble mechanisms; and a control system for effecting selective simultaneous axial adjustment of said wobble mechanisms alone or simultaneous axial adjustment of said wobble mechanisms together with said control rod comprising a first pivotally mounted control disc, and a second pivotally mounted control disc, means for independently turning said control discs, a common link pivotally connected to said control discs, means pivotally connecting said link to said second wobble mechanism, and a linkage connection between one of said control discs and the lower end of said control rod.

7. A helicopter comprising a body, wing drive means mounted on said body comprising an upright outer hollow shaft and an upright inner hollow shaft within the outer shaft and projecting beyond an end thereof, said shafts being rotatable in opposite directions about a common drive axis, means mounting a first wing on the projecting portion of the inner shaft for rotation therewith and pitch adjustment thereon, means mounting a second wing on the outer shaft for rotation therewith and pitch adjustment thereon, a first wobble mechanism between said wings, a second wobble mechanism below said second wing, means mounting each of said wobble mechanisms for axial adjustment along said drive axis, a linkage system connecting said wobble mechanisms with said wings and interconnecting said wobble mechanisms for simultaneous adjustment along said drive axis in either direction for adjusting the pitch of said wings in opposite directions, a control rod within the inner hollow shaft projecting beyond the upper end thereof and adjustable axially along said drive axis; said linkage including a lever member pivotally anchored on the projecting end of said control rod for effecting upon axial movement of said control rod with said wobble mechanisms, additional pitch adjustment of said first wing opposite to and double the pitch adjustment effected thereon by axial adjustment of said wobble mechanisms; a control system for effecting selective simultaneous axial adjustment of said wobble mechanisms alone or simultaneous axial adjustment of said wobble mechanisms together with said control rod comprising a first control member and a second control member, means for independently operating said control members, a link between said control members, a connection between said link and said second wobble mechanism, and a linkage connection between one of said control members and said control rod; and means for effecting tilting adjustment of said wobble mechanisms comprising an outer internally threaded nut, a screw turnable therein, a linkage connection between said screw and one of said wobble mechanisms, and control means for turning said nut to move the screw axially.

8. A helicopter comprising a body, wing drive means mounted on said body comprising an upright outer hollow shaft and an upright inner hollow shaft within the outer shaft and projecting beyond an end thereof, said shafts being rotatable in opposite directions about a common drive axis, means mounting a first wing on the projecting portion of the inner shaft for rotation therewith and pitch adjustment thereon, means mounting a second wing on the outer shaft for rotation therewith and pitch adjustment thereon, a first wobble mechanism between said wings, a second wobble mechanism below said second wing, means mounting each of said wobble mechanisms for axial adjustment along said drive axis, a linkage system connecting said wobble mechanisms with said wings and interconnecting said wobble mechanisms for simultaneous adjustment along said drive axis in either direction for adjusting the pitch of said wings in opposite directions, a control rod within the inner hollow shaft projecting beyond the upper end thereof and adjustable axially along said drive axis; said linkage including a lever member pivotally anchored on the projecting end of said control rod for effecting upon axial movement of said control rod with said wobble mechanisms, additional pitch adjustment of said first wing opposite to and double the pitch adjustment effected thereon by axial adjustment of said wobble mechanisms; a control system for effecting selective simultaneous axial adjustment of said wobble mechanisms alone or simultaneous axial adjustment of said wobble mechanisms together with said control rod comprising a first control member and a second control member, means for independently operating said control members, a link between said control members, a connection between said link and said second wobble mechanism, and a linkage connection between one of said control members and said control rod; and means for effecting tilting adjustment of said wobble mechanisms comprising an outer internally threaded nut positioned to turn about a generally horizontal axis, a screw turnable therein, an arm depending from said second wobble mechanism, a linkage pivotally connected to said arm and to said screw, and means for turning said nut to move the screw axially.

9. A helicopter comprising a body, wing drive means mounted on said body comprising an upright outer hollow shaft and an upright inner hollow shaft within the outer shaft and projecting beyond an end thereof, said shafts being rotatable in opposite directions about a common drive axis, means mounting a first wing on the projecting portion of the inner shaft for rotation therewith and pitch adjustment thereon, means mounting a second wing on the outer shaft for rotation therewith and pitch adjustment thereon, a first wobble mechanism between said wings, a second wobble mechanism below said second wing, means mounting each of said wobble mechanisms for axial adjustment along said axis, a linkage system connecting said wobble mechanisms with said wings and interconnecting said wobble mechanisms for simultaneous adjustment along said drive axis in either direction for adjusting the pitch of said wings in opposite directions, a control rod within the inner hollow shaft projecting beyond the upper end thereof and adjustable axially along said drive axis; said linkage including a lever member pivotally anchored on the projecting end of said control rod for effecting upon axial movement of said control rod with said wobble mechanisms, additional pitch adjustment of said first wing opposite to and double the pitch adjustment effected thereon by axial adjustment of said wobble mechanisms; a control system for effecting selective simultaneous axial adjustment of said wobble mechanisms alone or simultaneous axial adjustment of said wobble mechanisms together with said control rod comprising a first control member and a second control member, means for independently operating said control members, a link between said control members, a connection between said link and said second wobble mechanisms, and a linkage connection between one of said control members and said control rod; and means for effecting tilting adjustment of said wobble mechanisms comprising an outer internally threaded nut positioned to turn about a generally horizontal axis, a screw turnable therein, an arm depending from said second wobble mechanism, a linkage pivotally connected to said arm and to said screw, the outer surface of said nut being threaded, and means including an adjusting cord engaging said outer threaded surface to turn the nut and move the screw axially.

10. In a helicopter, a wing rotatable about a drive axis and mounted for pitch adjustment about its own axis, cyclic pitch control means for the wing including wobble mechanism about said drive axis; and means for effecting tilting adjustment of said wobble mechanism comprising an outer internally threaded nut positioned to turn about a generally horizontal axis, a screw turnable therein, an arm depending from said wobble mechanism, a linkage pivotally connected to said arm and to said screw, and means including a flexible member looped over and in engagement with the periphery of said nut for turning said nut to move the screw axially.

11. In a helicopter, a wing rotatable about a drive axis and mounted for pitch adjustment about its own axis, cyclic pitch control means for the wing including wobble mechanism about said drive axis; and means for effecting tilting adjustment of said wobble mechanism comprising an outer internally threaded nut positioned to turn about a generally horizontal axis, a screw turnable therein, an arm depending from said wobble mechanism, a linkage pivotally connected to said arm and to said screw, the outer surface of said nut being threaded, and means including an adjusting cord engaging said threaded outer surface to turn the nut and move the screw axially.

STANLEY HILLER, Jr.

REFERENCES CITED

The following references are of record in the file of this patent:

UNITED STATES PATENTS

| Number    | Name          | Date           |
|-----------|---------------|----------------|
| 1,345,101 | Perry         | June 29, 1920  |
| 1,506,716 | Pescara       | Aug. 26, 1924  |
| 1,919,089 | Breguet et al.| July 18, 1933  |
| 2,256,918 | Young         | Sept. 23, 1941 |
| 2,402,349 | Sikorsky      | June 18, 1946  |
| 2,422,441 | Sights        | June 17, 1947  |